US012729075B2

(12) United States Patent
Nomura

(10) Patent No.: US 12,729,075 B2
(45) Date of Patent: Sep. 8, 2026

(54) CONVEYANCE DEVICE, CONVEYANCE METHOD, AND NON-TRANSITORY COMPUTER READABLE MEDIUM

(71) Applicant: Yamaha Robotics Co., Ltd., Tokyo (JP)

(72) Inventor: Katsutoshi Nomura, Tokyo (JP)

(73) Assignee: Yamaha Robotics Co., Ltd., Tokyo (JP)

( * ) Notice: Subject to any disclaimer, the term of this patent is extended or adjusted under 35 U.S.C. 154(b) by 622 days.

(21) Appl. No.: 18/271,039

(22) PCT Filed: Mar. 16, 2021

(86) PCT No.: PCT/JP2021/010475
§ 371 (c)(1),
(2) Date: Jul. 5, 2023

(87) PCT Pub. No.: WO2022/195693
PCT Pub. Date: Sep. 22, 2022

(65) Prior Publication Data
US 2024/0076142 A1 Mar. 7, 2024

(51) Int. Cl.
*B65G 43/08* (2006.01)
*B65G 47/91* (2006.01)
*B65G 49/06* (2006.01)

(52) U.S. Cl.
CPC ........... *B65G 49/061* (2013.01); *B65G 43/08* (2013.01); *B65G 47/917* (2013.01); *B65G 2201/0297* (2013.01)

(58) Field of Classification Search
CPC ...... B65G 43/08; B65G 47/917; B65G 49/05; B65G 49/06; B65G 49/061; B65G 49/063;
(Continued)

(56) References Cited

U.S. PATENT DOCUMENTS 5,758,410 A * 6/1998 Asai .................. H05K 13/0409 294/185
6,282,779 B1 * 9/2001 Nakano ................ H05K 13/082 414/737
(Continued)

FOREIGN PATENT DOCUMENTS

CN 105070670 11/2015
CN 207517718 6/2018
(Continued)

OTHER PUBLICATIONS

"International Search Report (Form PCT/ISA/210) of PCT/JP2021/010475", mailed on Jun. 22, 2021, with English translation thereof, pp. 1-6.
(Continued)

*Primary Examiner* — Joshua E Rodden
(74) *Attorney, Agent, or Firm* — JCIPRNET

(57) ABSTRACT

This conveyance device includes: a suction head which suctions and conveys an electronic component; a movement control unit which moves the suction head; a rotation control unit which controls a rotation position of the suction head centered on a predetermined axis of rotation; and a suction control unit which causes the suction head to suction the electronic component such that a load exerted on the electronic component from the suction head in conjunction with the movement of the suction head is less than or equal to a predetermined pressure. The movement control unit sets a correction amount of the predetermined pressure based on the self-weight of the suction head on the basis of the rotation position of the suction head. Using a conveyance device such as the foregoing makes it possible to improve the accuracy of load control during suction or suction release of an electronic component.

5 Claims, 8 Drawing Sheets

(58) Field of Classification Search

CPC .. B65G 49/064; B65G 49/065; B65G 49/066; B65G 49/067; B65G 49/068; B65G 49/069; B65G 49/07; B65G 2201/0297; H10P 72/00; H10P 72/0431; H10P 72/0438; H10P 72/0442; H10P 72/0451; H10P 72/0478

USPC .......................................................... 294/185

See application file for complete search history.

(56) References Cited

U.S. PATENT DOCUMENTS

| | | | | |
|---|---|---|---|---|
| 10,497,590 | B2 | 12/2019 | Seyama | |
| 2024/0076142 | A1 * | 3/2024 | Nomura | B65G 49/061 |

FOREIGN PATENT DOCUMENTS

| | | | | |
|---|---|---|---|---|
| EP | 3522207 | | | 9/2020 |
| JP | 2001077155 | | | 3/2001 |
| JP | 2001274199 | A | * | 10/2001 |
| JP | 3567896 | | | 9/2004 |
| JP | 4881455 | B2 | * | 2/2012 |
| JP | 2012202416 | | | 10/2012 |
| JP | 2017108056 | | | 6/2017 |
| KR | 1643386 | B1 | * | 7/2016 |
| WO | 2012073282 | | | 6/2012 |
| WO | 2017119216 | | | 7/2017 |
| WO | 2018061103 | | | 4/2018 |

OTHER PUBLICATIONS

"Office Action of Taiwan Counterpart Application", issued on Apr. 13, 2023, with English translation thereof, pp. 1-10.

* cited by examiner

CONVEYANCE DEVICE, CONVEYANCE METHOD, AND NON-TRANSITORY COMPUTER READABLE MEDIUM

CROSS-REFERENCE TO RELATED APPLICATION

This application is a 371 application of the International PCT application serial no. PCT/JP2021/010475, filed on Mar. 16, 2021. The entirety of the above-mentioned patent application is hereby incorporated by reference herein and made a part of this specification.

TECHNICAL FIELD

The invention relates to a conveyance device, a conveyance method, and a program.

RELATED ART

Conventionally, flip chip bonding is widely known as a technique for mounting a semiconductor chip on a circuit board. In such technique, firstly, a semiconductor chip picked up from a wafer is flipped, and the surface of the semiconductor chip on the side opposite to a bump is turned to a bonding tool to be sucked. In addition, by thermally welding the bump of the semiconductor chip to an electrode of a circuit substrate by using a bonding tool, the bump and the electrode of the circuit substrate are bonded (see Patent Document 1, for example).

CITATION LIST

Patent Literature

Patent Document 1: Japanese Patent No. 3567896

SUMMARY OF INVENTION

Technical Problem

However, in the conventional technique, there is still room for improvement in controlling the load acting on the semiconductor chip from the bonding tool at the time of sucking the semiconductor chip.

Such issue is not limited to the case of sucking the semiconductor chip, but is a common issue in also the case of releasing the suction of the semiconductor chip to pass the semiconductor chip from the bonding tool to another component. In addition, the issue is not limited to semiconductor chips, but is also a common issue in also the case of sucking an electronic component.

The invention aims at solving the issue and provides a conveyance device, a conveyance method, and a program capable of facilitating the accuracy of load control at the time of sucking an electronic component as well as the time of releasing suction.

Solution to Problem

A conveyance device according to a first aspect of the invention includes: a suction head; a movement control unit, moving the suction head; a rotation control unit, controlling a rotation position of the suction head centered on a predetermined rotation shaft; and a suction control unit, causing the suction head to suck or release suction of the electronic component, so that a load acting on the electronic component from the suction head in conjunction with movement of the suction head is equal to or less than a predetermined pressure. The movement control unit sets, based on the rotation position of the suction head, a correction amount of the predetermined pressure that is based on a self-weight of the suction head.

In addition, a conveyance method according to a second aspect of the invention includes: a step of moving a suction head; a step of controlling a rotation position of the suction head centered on a predetermined rotation shaft; a step of causing the suction head to suck or release suction of an electronic component, so that a load acting on the electronic component from the suction head in conjunction with movement of the suction head is equal to or less than a predetermined pressure; and a step of setting, based on the rotation position of the suction head, a correction amount of the predetermined pressure that is based on a self-weight of the suction head.

In addition, a program according to a third aspect of the invention causes a computer to execute: a process of moving a suction head; a process of controlling a rotation position of the suction head centered on a predetermined rotation shaft; a process of causing the suction head to suck or release suction of an electronic component, so that a load acting on the electronic component from the suction head in conjunction with movement of the suction head is equal to or less than a predetermined pressure; and a process of setting, based on the rotation position of the suction head, a correction amount of the predetermined pressure that is based on a self-weight of the suction head.

Effects of Invention

According to the invention, the load control accuracy at the time of sucking an electronic component and the time of releasing suction can be facilitated.

DESCRIPTION OF EMBODIMENTS

Hereinafter, the invention will be described through embodiments of the invention, but the invention according to the scope of claims is not limited to the following embodiments. Moreover, not all the configurations described in the embodiments are essential as means for solving the problems.

Figure 1:
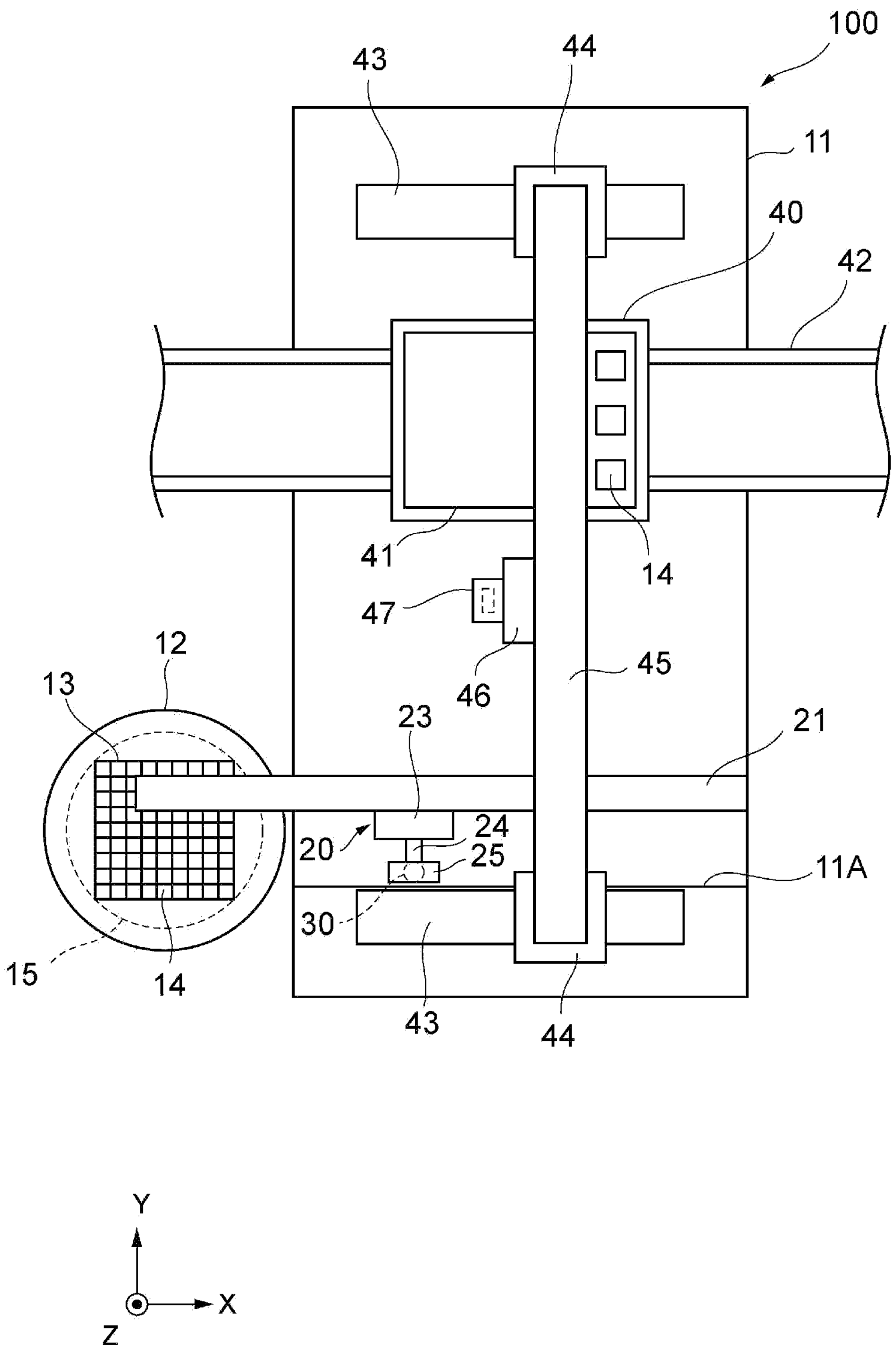
FIG. 1 is a plan view illustrating a configuration of a flip chip bonding apparatus in which a handling unit according to an embodiment is mounted.

As shown in FIG. 1, a wafer holder 12 is provided on a lateral side of a pedestal 11 of a flip chip bonding apparatus 100. The wafer holder 12 is formed in an annular shape and holds a wafer 13 that is diced. The wafer holder 12 moves in Y direction by using a driving motor (not shown). On the lower side of the wafer holder 12, a push-up unit 15 pushing the semiconductor chip 14 upward from the diced wafer 13 is provided. The push-up unit 15 moves in X direction by using a driving motor (not shown). The semiconductor chip 14 is an example of an electronic component.

In the pedestal 11, a handling unit 20, as an example of a conveyance device, is provided. The handling unit 20 picks up the semiconductor chip 14 from the wafer holder 12, flips the semiconductor chip 14 that is picked up, and passes the flipped semiconductor chip 14 to a mounting head 46.

Figure 2:
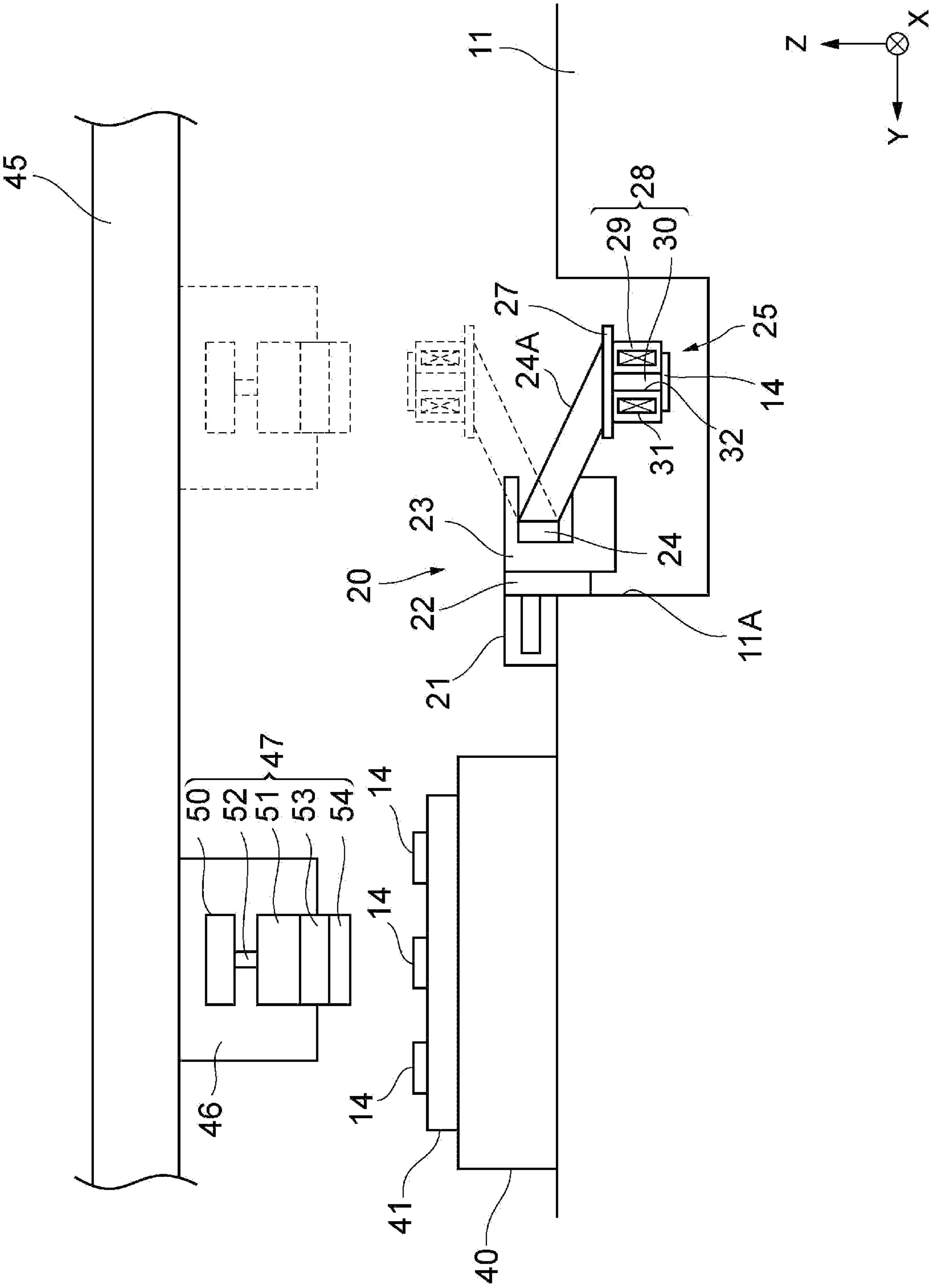
FIG. 2 is a side view illustrating a configuration of the flip chip bonding apparatus in which the handling unit according to the embodiment is mounted.

As shown in FIG. 2, the handling unit 20, for example, includes a guide rail 21, a slider 22, a carriage 23, a rotation shaft 24, an attachment arm 24A, a flip head 25, and a stepping motor 26.

The guide rail 21 is fixed to a concave unit 11A formed on the upper surface of the pedestal 11. The concave unit 11A is formed in an elongated groove shape extending in X direction. The slider 22 is attached to the guide rail 21. The slider 22 is configured to be movable in X direction by using a driving motor 22A (see FIG. 4). The carriage 23 is attached to the slider 22. The carriage 23 is configured to be movable in X direction through the movement of the slider 22 along the guide rail 21. The attachment arm 24A is attached to the carriage 23 via the rotation shaft 24. The attachment arm 24A extends in a direction obliquely intersecting with the central line of the rotation shaft 24. The tip of the attachment arm 24A is attached to the flip head 25. The stepping motor 26 (see FIG. 4) flips the flip head 25 by rotating the rotation shaft 24.

The flip head 25, for example, includes a base 27 and a pick-up nozzle 28. The base 27 is formed in a plate shape and fixed to an end of the rotation shaft 24. The pick-up nozzle 28 is fixed to the base 27. The pick-up nozzle 28, for example, includes a casing 29, a suction head 30, and an electromagnetic coil 31. The casing 29 is formed in an annular shape and accommodates the electromagnetic coil 31 in the annular portion thereof. A through hole 32 extending in the longitudinal direction of the casing 29 is formed at the center of the casing 29. The suction head 30 is configured to be able to suck the semiconductor chip 14 to the tip end surface thereof. The suction head 30 is accommodated in the through hole 32 of the casing 29. The suction head 30 is configured to move the through hole 32 of the casing 29 and be able to adjust the extension amount from the end surface of the casing 29 by conducting power to the electromagnetic coil 31.

As shown in FIG. 1, a mounting stage 40 is provided on the upper surface of the pedestal 11. The mounting stage 40 sucks the circuit substrate 41 to which the semiconductor chip 14 is mounted and heats the circuit substrate 41 by using a built-in heater. A conveyance rail 42 is connected to the mounting stage 40. The conveyance rail 42 supplies the circuit substrate 41 from a substrate supply unit (not shown) to the mounting stage 40, and supplies the circuit substrate 41 to which the semiconductor chip 14 is mounted to a product stock (not shown).

A pair of guide rails 43 extending in X direction are provided on the upper surface of the pedestal 11. A slider 44 is attached to each of the pair of guide rails 43. The slider 44 is configured to be movable in X direction by using a driving motor (not shown).

A gantry frame 45 is a gate-shaped frame extending in Y direction, and a leg part thereof is fixed to the slider 44. The gantry frame 45 is configured to be movable in X direction through the movement of the slider 44 along the guide rail 43.

The mounting head 46 is attached to the gantry frame 45. The mounting head 46 is provided with a mounting nozzle 47 and configured to be movable in Y direction by using a driving motor (not shown). The mounting head 46 sucks the semiconductor chip 14 and mounts the semiconductor chip 14 to the circuit substrate 41.

As shown in FIG. 2, the mounting nozzle 47 includes, for example, a motor 50, a base body 51, a ball screw 52, a pulse heater 53, and a mounting tool 54. The motor 50 is fixed to the mounting head 46. The base body 51 is attached to the mounting head 46 to be movable in Z direction. The ball screw 52 moves the base body 51 in Z direction through rotation based on a driving force from the motor 50. The pulse heater 53 is attached to the base body 51, and the mounting tool 54 is attached to the lower side thereof. The mounting tool 54 is configured to be able to suck the semiconductor chip 14 on the tip end surface thereof. When the base body 51 moves in Z direction by the motor 50, the mounting tool 54 moves with the base body 51 in Z direction.

Figure 3A:
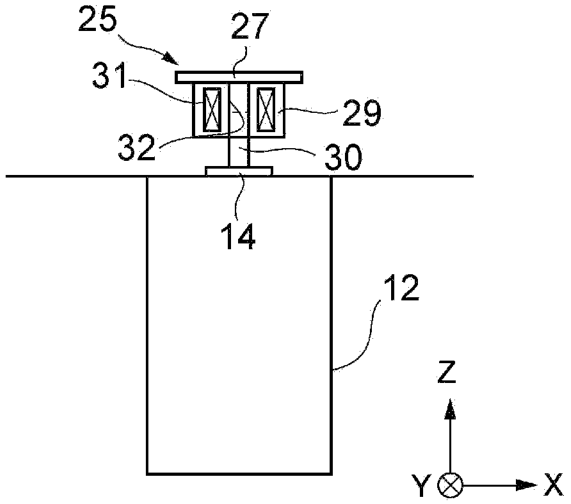
FIG. 3A is a view illustrating an operation of the handling unit according to the embodiment.

In the following, the operation of the handling unit 20 is described. Firstly, as shown in FIG. 3A, in the flip head 25, the suction head 30 sucks the semiconductor chip 14 held on the wafer holder 12 by conducting power to the electromagnetic coil 31.

Figure 3B:
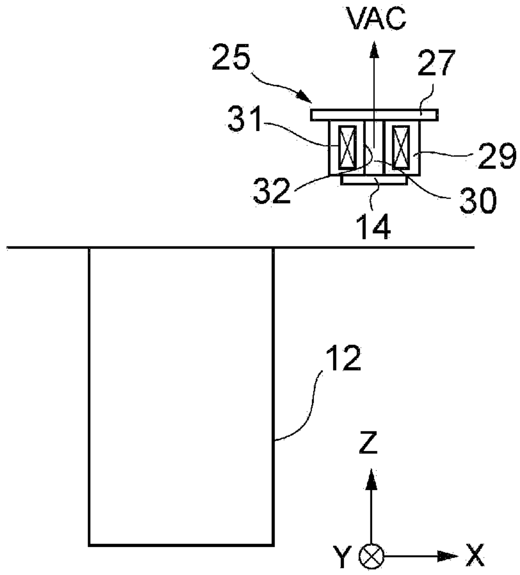
FIG. 3B is a view illustrating the operation of the handling unit according to the embodiment.

Then, as shown in FIG. 3B, in the flip head 25, by controlling the power conducted to the electromagnetic coil 31, the suction head 30 moves upward, and the suction head 30 picks up the semiconductor chip 14 from the wafer holder 12. In addition, the flip head 25 moves with the carriage 23 along the guide rail 21 in X direction in the state in which the suction head 30 sucks the semiconductor chip 14. The flip head 25 supplies a suction force VAC by using a vacuum device not shown herein to suck a semiconductor chip.

Figure 3C:
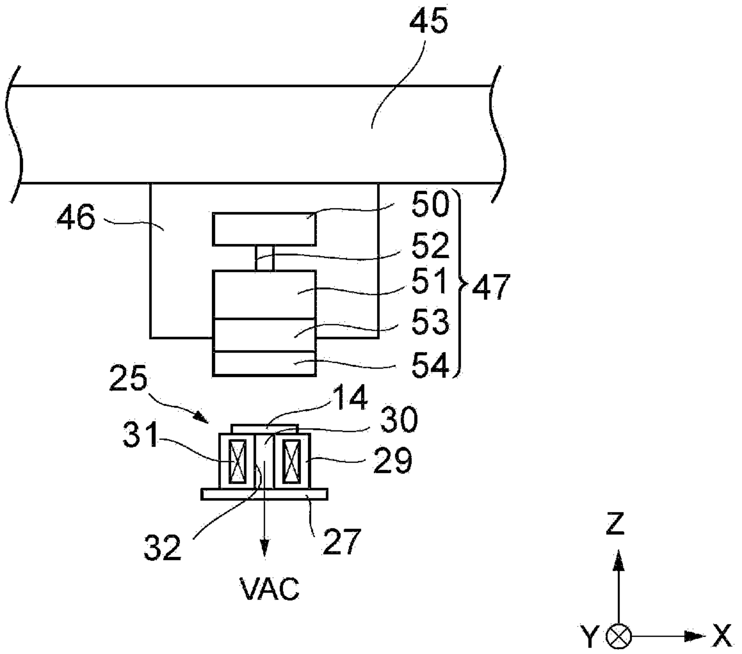
FIG. 3C is a view illustrating the operation of the handling unit according to the embodiment.

Then, as shown in FIG. 3C, when arriving at the vertical bottom of the mounting head 46, the flip head 25 drives the stepping motor 26 and flips the flip head 25.

Figure 3D:
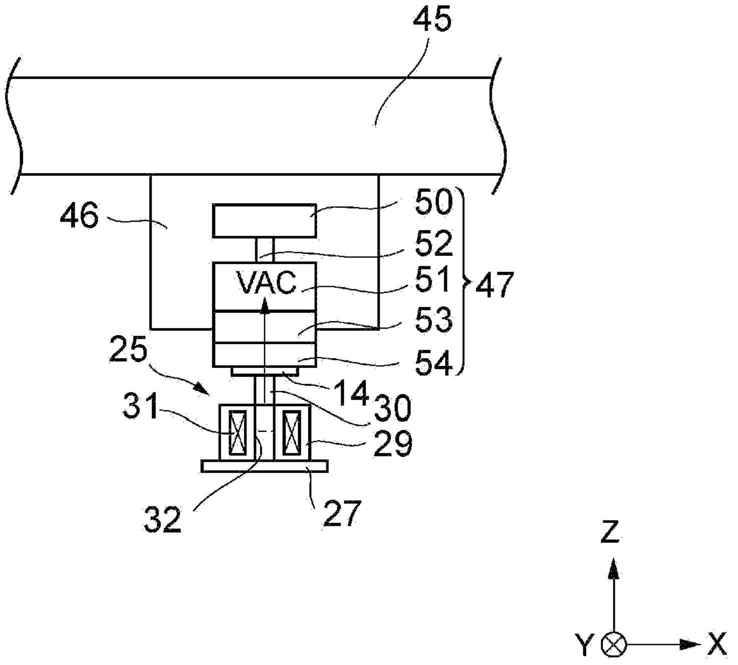
FIG. 3D is a view illustrating the operation of the handling unit according to the embodiment.

Then, as shown in FIG. 3D, by conducting power to the electromagnetic coil 31, the flip head 25 presses the semiconductor chip 14 against the mounting head 46 in the state in which the suction head 30 sucks the semiconductor chip 14.

Figure 3E:
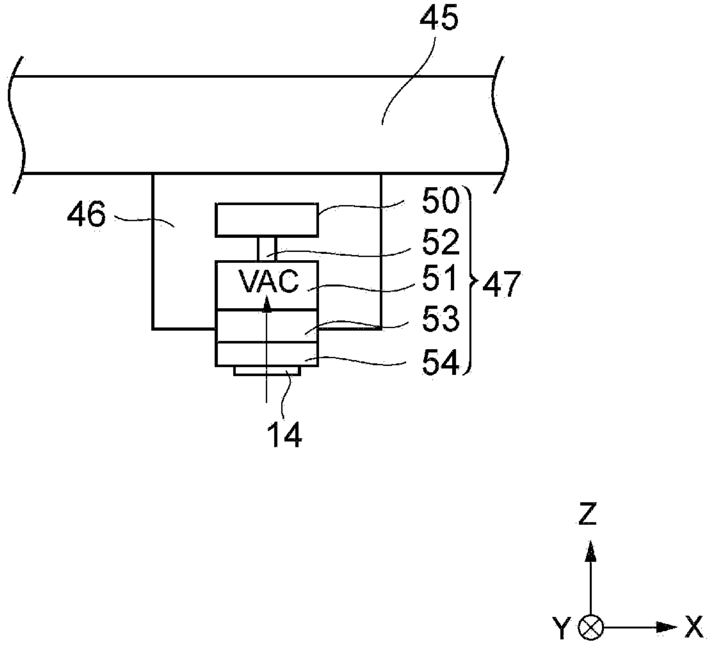
FIG. 3E is a view illustrating the operation of the handling unit according to the embodiment.

Then, as shown in FIG. 3E, after the mounting head 46 sucks the semiconductor chip 14, the handling unit 20 separates the suction head 30 from the mounting head 46 by controlling the power conducted to the electromagnetic coil 31. Accordingly, the passing of the semiconductor chip 14 from the handling unit 20 to the mounting head 46 is completed.

Figure 4:
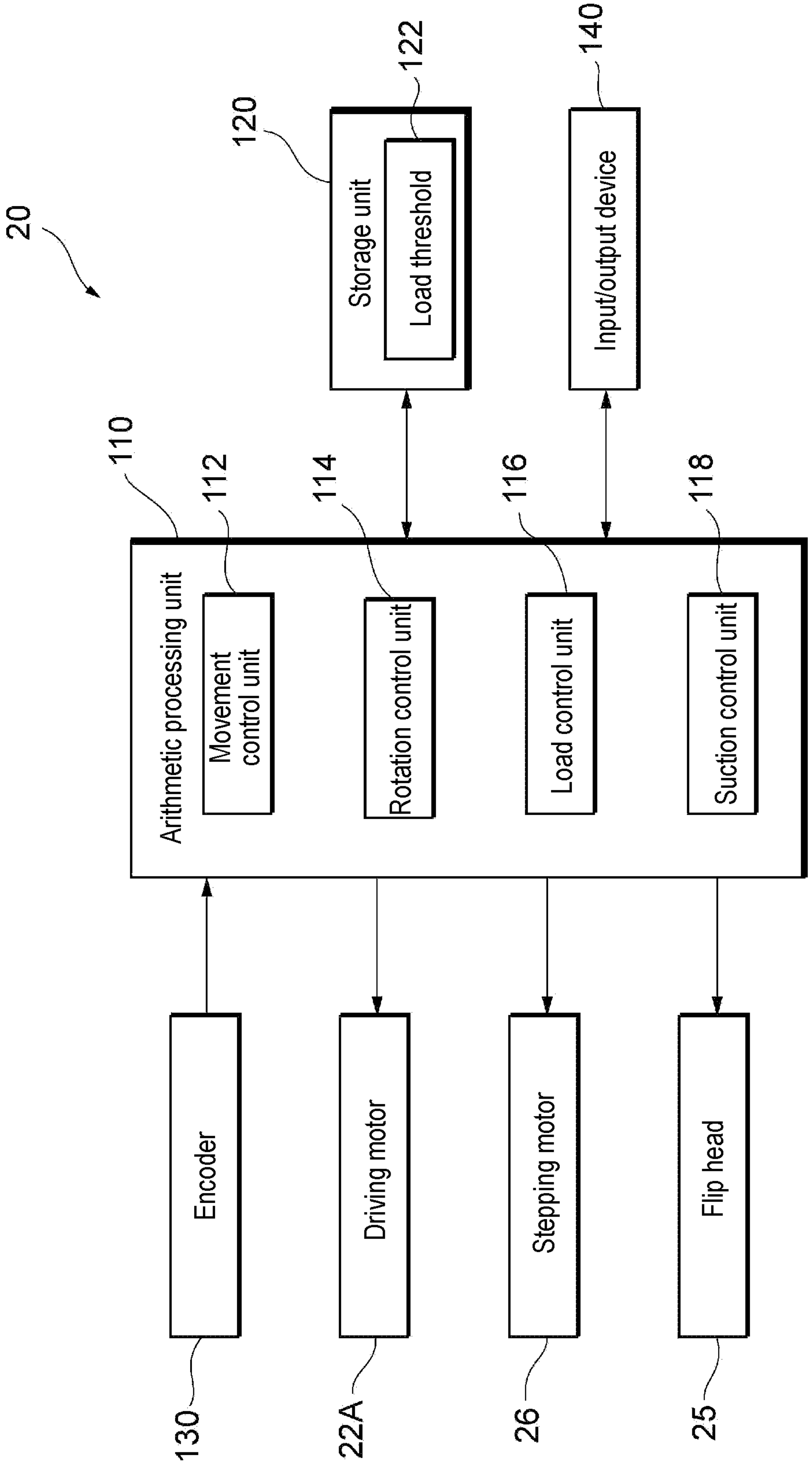
FIG. 4 is a diagram illustrating a system configuration of the handling unit according to the embodiment.

In the following, the control configuration of the handling unit 20 is described. As shown in FIG. 4, the handling unit 20, for example, includes an arithmetic processing unit 110, a storage unit 120, a driving motor 22A, the stepping motor 26, the flip head 25, an encoder 130, and an input/output device 140. The arithmetic processing unit 110 is a processor (central processing unit, CPU) performing processes executing the control and the program of the handling unit 20. The processor may have a configuration in which an application specific integrated circuit (ASIC) or a graphic processing unit (GPU), etc., cooperate with an arithmetic processing chip. The arithmetic processing unit 110 reads a suction control program stored in the storage unit 120, and executes various processes relating to suction control.

The storage unit 120 is a non-volatile storage medium, and is formed by a hard disk drive (HDD), for example. In addition to storing the program that executes the control or the processing of the handling unit 20, the storage unit 120 stores various parameter values, functions, lookup tables, etc., for exerting control or carrying out calculation. A load threshold 122 is an example of the parameter values used for exerting control or carrying out calculation.

The driving motor 22A moves the slider 22 in X direction based on a driving signal output from the arithmetic processing unit 110. The arithmetic processing unit 110 generates a driving signal based on X-direction position information of the slider 22 measured by the encoder 130, and outputs the generated driving signal to the driving motor 22A.

The stepping motor 26 flips the flip head 25 by rotating the rotation shaft 24 based on the driving signal output from the arithmetic processing unit 110. The arithmetic processing unit 110 specifies the rotation position of the flip head 25 based on the driving signal output to the stepping motor 26. In addition, the arithmetic processing unit 110 generates a driving signal based on the specified rotation position, and outputs the generated driving signal to the stepping motor 26.

The flip head 25 adjusts the extension amount of the suction head from the end surface of the casing 29 by conducting power to the electromagnetic coil 31 based on the driving signal output from the arithmetic processing unit 110.

The input/output device 140 is a device including a keyboard, a mouse, a display monitor, for example, receives a menu operation by a user, and presents information to the user. The input/output device 140, for example, outputs a signal indicating a suction control start command to the arithmetic processing unit 110 based on an operation by the user.

The arithmetic processing unit 110 also serves as a functional arithmetic unit which executes various arithmetic operations in correspondence with the process instructed in the suction control program. The arithmetic processing unit 110 includes, for example, a movement control unit 112, a rotation control unit 114, a load control unit 116, and a suction control unit 118.

The movement control unit 112 moves the suction head 30. The movement control unit 112, for example, moves the slider 22 along the guide rail 21 in X direction based on the position information measured by the encoder 130, and moves the suction head 30 of the flip head 25 attached to the slider 22 in X direction.

The rotation control unit 114 controls the rotation position of the suction head 30 with the predetermined rotation shaft 24 as the center. The predetermined rotation shaft 24, for example, is a shaft rotating in a horizontal direction. When the position of the slider 22 measured by the encoder 130 arrives at the vertical bottom of the mounting head 46, for example, the rotation control unit 114 flips the flip head 25 by driving the stepping motor 26 to rotate the rotation shaft 24.

The load control unit 116 controls the magnitude of the load acting on the semiconductor chip 14 from the suction head 30. The load control unit 116, for example, controls the magnitude of the load acting on the semiconductor chip 14 from the suction head 30 based on the amount of power conducted to the electromagnetic coil 31 and the movement amount of the suction head 30.

The suction control unit 118 causes the suction head 30 to suck the semiconductor chip 14, so that the load acting on the semiconductor chip 14 from the suction head 30 is equal to or lower than the load threshold 122 in conjunction with movement of the suction head 30. For example, when the suction head 30 moves to a suction position of sucking the semiconductor chip 14, the suction control unit 118 causes the suction head 30 to suck the semiconductor chip 14. The suction control unit 118, for example, extends the suction head 30 from the end surface of the casing 29 and makes the extending suction head 30 approach the semiconductor chip 14 by conducting power to the electromagnetic coil 31. Then, when the magnitude of the load acting on the semiconductor chip 14 from the suction head 30 is a positive value, the suction control unit 118 detects that the suction head 30 has moved to the suction position.

The movement control unit 112 moves the suction head 30 from the suction position of the semiconductor chip 14 under the condition that the load acting on the semiconductor chip 14 from the suction head 30 becomes the load threshold 122. For example, when the suction head 30 is located at the suction position, the movement control unit 112 moves the suction head 30 in the state of sucking the semiconductor chip 14 from the suction position under the condition that the load acting on the semiconductor chip 14 from the suction head becomes the load threshold 122. The load threshold 122 is an example of the predetermined pressure.

Based on the rotation position of the suction head 30, the movement control unit 112 sets a correction amount of the load threshold 122 that is based on the self-weight of the suction head 30. For example, when the suction head 30 is located at a first rotation position, the movement control unit 112 sets the correction amount of the load threshold 122 that is based on the self-weight of the suction head 30 to a first correction amount. When the suction head 30 is located at a second rotation position, the movement control unit 112 sets the correction amount of the load threshold 122 that is based on the self-weight of the suction head 30 to a second correction amount. For example, when the suction surface of the suction head 30 faces downward, the movement control unit 112 sets the correction amount of the load threshold 122 that is based on the self-weight of the suction head 30 to a negative value, and when the suction surface of the suction head 30 faces upward, the movement control unit 112 sets the correction amount of the load threshold 122 that is based on the self-weight of the suction head 30 to a positive value. For example, the movement control unit 112 sets a value obtained by inverting the positivity/negativity of the correction amount of the load threshold 122 that is based on the self-weight of the suction head 30 when the suction head 30 faces vertically downward as the correction amount of the load threshold 122 that is based on the self-weight of the suction head 30 when the suction head 30 faces vertically upward.

Figure 5A:
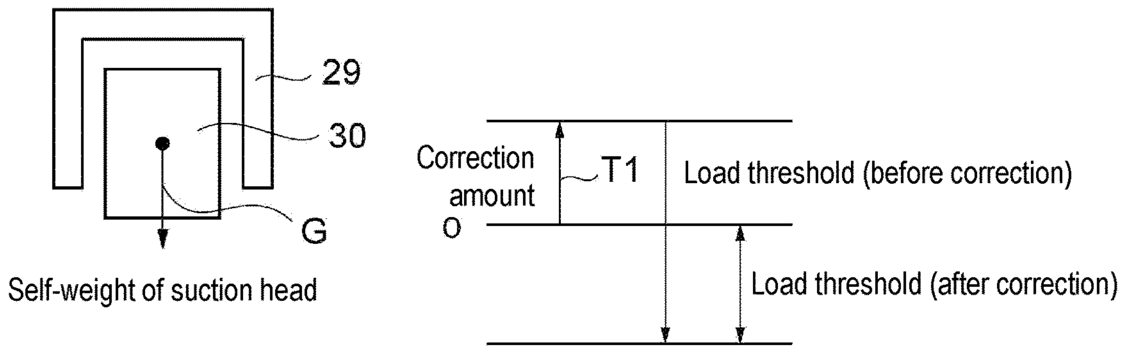
FIG. 5A is a diagram illustrating a process for correcting a load threshold in the handling unit according to the embodiment.

More specifically, as shown in FIG. 5A, when the suction surface of the suction head 30 faces downward, the movement control unit 112 sets the correction amount of the load threshold 122 that is based on a self-weight G of the suction head 30 to a negative value. The movement control unit 112, for example, sets a value obtained by subtracting an absolute value T1 of the correction amount of the load threshold 122 from the load threshold 122 before correction as the load threshold 122 after correction. The absolute value T1 of the correction amount of the load threshold 122 is stored in advance in the storage unit 120, for example.

Figure 5B:
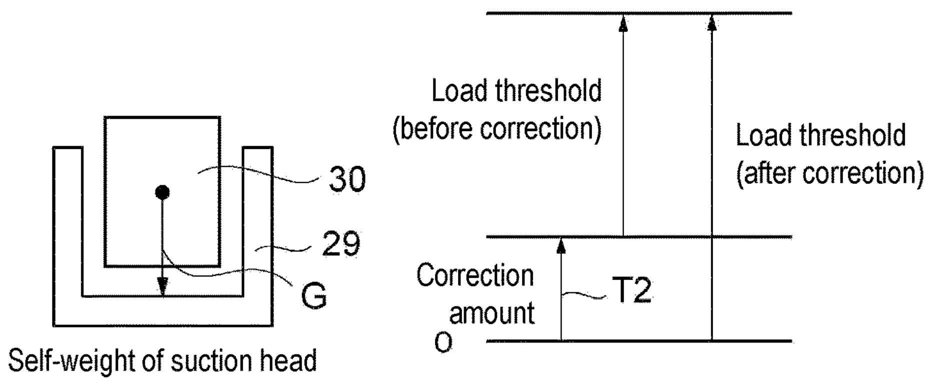
FIG. 5B is a diagram illustrating a process for correcting a load threshold in the handling unit according to the embodiment.

As shown in FIG. 5B, when the suction surface of the suction head 30 faces upward, the movement control unit 112 sets the correction amount of the load threshold 122 that is based on the self-weight G of the suction head 30 to a positive value. The movement control unit 112, for example, sets a value obtained by adding an absolute value T2 of the correction amount of the load threshold 122 to the load threshold 122 before correction as the load threshold 122 after correction. The movement control unit 112, for example, adopts the absolute value T1 of the correction amount of the load threshold 122 stored in advance in the storage unit 120 as the absolute value T2 of the correction amount of the load threshold 122.

Figure 5C:
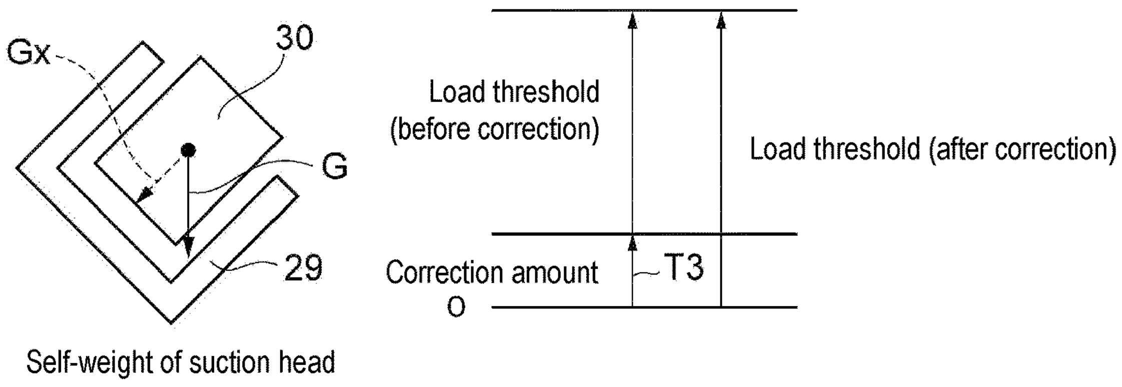
FIG. 5C is a diagram illustrating a process for correcting a load threshold in the handling unit according to the embodiment.

As shown in FIG. 5C, when the suction surface of the suction head 30 faces obliquely upward, the movement control unit 112 sets the correction amount of the load threshold 122 that is based on the self-weight of the suction head 30 to a positive value. In such case, the movement control unit 112 sets a value obtained by adding an absolute value T3 of the correction amount of the load threshold 122 to the load threshold 122 before correction as the load threshold 122 after correction. The absolute value T3 of the correction amount of the load threshold 122 is a value set based on a self-weight component Gx along the movement direction of the suction head 30 in the self-weight G of the suction head 30, and is a value smaller than the absolute value T2 of the correction amount of the load threshold 122.

Figure 6:
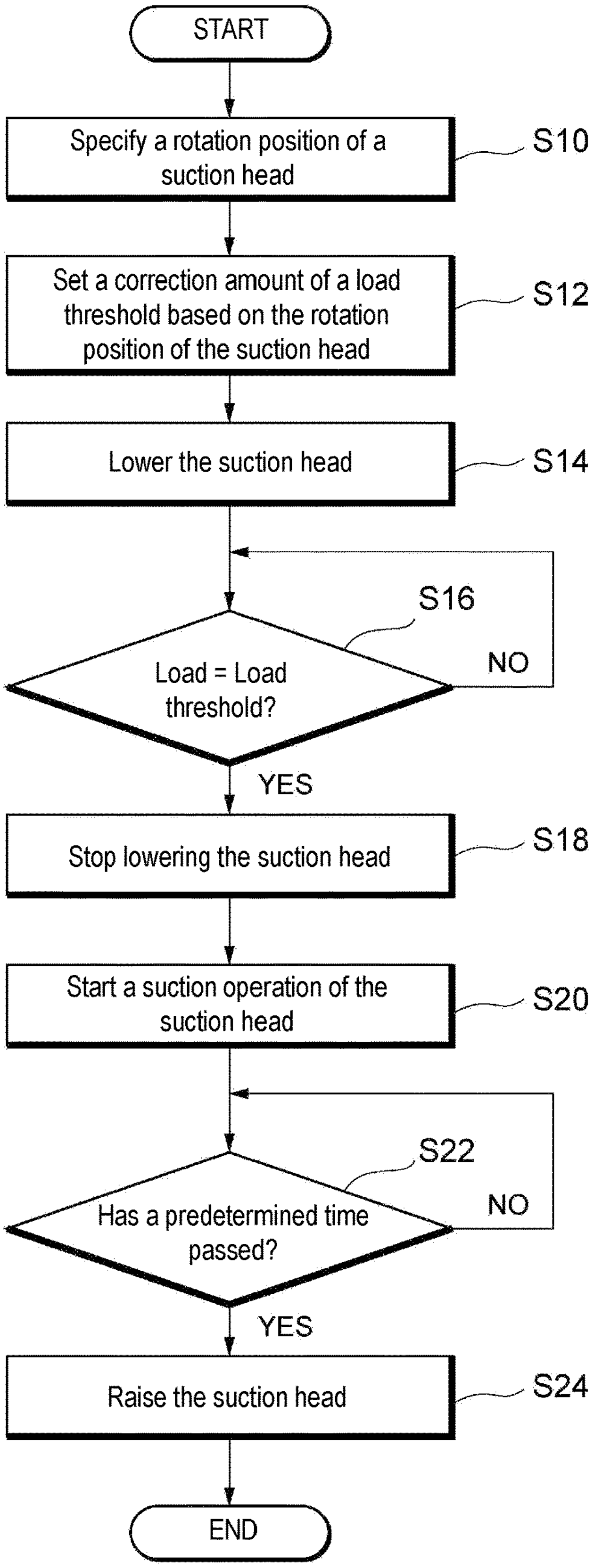
FIG. 6 is a flowchart illustrating a processing order of an arithmetic processing unit.

FIG. 6 is a flowchart illustrating a processing order of the arithmetic processing unit 110. The flowchart shown in FIG. 6, for example, is executed when a passing control start command by the user is received via the input/output device 140.

As shown in FIG. 6, the arithmetic processing unit 110 firstly specifies the rotation position of the suction head 30 based on the driving signal output to the stepping motor 26 (Step S10).

Then, the arithmetic processing unit 110 sets the correction amount of the load threshold 122 based on the rotation position of the suction head 30 specified in Step S10 (Step S12).

Then, the arithmetic processing unit 110 conducts power to the electromagnetic coil 31 to lower the suction head 30 (Step S14).

Then, the arithmetic processing unit 110 calculates the magnitude of the load acting on the semiconductor chip 14 from the suction head 30 based on the amount of power conducted to the electromagnetic coil 31 and the movement amount of the suction head 30, and determines whether the magnitude of the calculated load reaches the load threshold 122 after correction (Step S16). In the case of determining that the magnitude of the load acting on the semiconductor chip 14 from the suction head 30 does not reach the load threshold 122 after correction (Step S16=NO), the arithmetic processing unit 110 maintains the power conducted to the electromagnetic coil 31 to keep lowering the suction head 30 until the magnitude of the load reaches the load threshold 122 after correction. Meanwhile, in the case of determining that the magnitude of the load acting on the semiconductor chip 14 from the suction head 30 reaches the load threshold 122 after correction (Step S16=YES), the arithmetic processing unit 110 maintains the power conducted to the electromagnetic coil 31, and stops lowering the suction head 30 (Step S18).

Then, the arithmetic processing unit 110 outputs the driving signal to the suction head 30 to start the suction operation of the suction head 30 (Step S20). In the case of determining that a predetermined time has passed since the suction operation of the suction head 30 starts (Step S22=YES), the arithmetic processing unit 110 conducts power to the electromagnetic coil 31 to raise the suction head 30 (Step S24).

The embodiments may also be implemented in the following modes.

In the embodiment, when passing the semiconductor chip 14 from the suction head 30 to the mounting head 46, the suction control unit 118 may also release the suction of the suction head 30 to the semiconductor chip 14, so that the load acting on the semiconductor chip 14 from the suction head 30 is equal to or lower than the load threshold 122 in conjunction with movement of the suction head 30. In such case, the movement control unit 112, for example, moves the suction head 30 from a suction release position of the semiconductor chip 14 under the condition that the load acting on the semiconductor chip 14 from the suction head 30 becomes the predetermined pressure.

In the above embodiment, the movement control unit 112 may set the load threshold 122 to an upper limit value, while moving the suction head 30 from the suction position of the semiconductor chip 14 at the time point when the load acting on the semiconductor chip 14 from the suction head 30 reaches a value smaller than the load threshold 122. That is, the load threshold 122 does not necessarily have to be a value that serves as a trigger when transitioning the process of the suction head 30.

In the embodiment, a sensor that detects the rotation position of the suction head 30 may be provided, and the movement control unit 112 may set, based on the detection result of the sensor, the correction amount of the load threshold 122 that is based on the self-weight G of the suction head 30.

In the embodiment, a data table indicating the corresponding relationship between the rotation position of the suction head 30 and the correction amount of the load threshold 122 that is based on the self-weight G of the suction head 30 is prepared in advance, and the movement control unit 122 may, based on the rotation position of the suction head 30, refer to the data table and set the correction amount of the load threshold 122 based on the self-weight G of the suction head 30.

As described above, the case where the conveyance device according to the embodiment is applied to the flip chip bonding device 100 has been described as an example. However, the conveyance device according to the embodiment is not limited to the flip chip bonding apparatus 100, and may be applicable to, for example, a pickup tool or a die bonding apparatus as long as it has a configuration for rotating the suction head.

What is claimed is:

1. A conveyance device, comprising:

a suction head, sucking and conveying an electronic component;

a processor, moving the suction head, controlling a rotation position of the suction head centered on a predetermined rotation shaft, and causing the suction head to suck or release suction of the electronic component, so that a load acting on the electronic component from the suction head in conjunction with movement of the suction head is equal to or less than a predetermined pressure, wherein the processor sets, based on the rotation position of the suction head, a correction amount of the predetermined pressure that is based on a self-weight of the suction head, and the processor moves the suction head from a suction position or a suction release position of the electronic component under a condition that the load acting on the electronic component from the suction head becomes the predetermined pressure.

2. The conveyance device as claimed in claim 1, wherein the processor sets the correction amount of the predetermined pressure that is based on the self-weight of the suction head to a negative value when a suction surface of the suction head faces downward, and sets the correction amount of the predetermined pressure that is based on the self-weight of the suction head to a positive value when the suction surface of the suction head faces upward.

3. The conveyance device as claimed in claim 2, wherein the processor sets a value obtained by inverting a positivity/negativity of the correction amount of the predetermined pressure that is based on the self-weight of the suction head when the suction head faces vertically downward as the correction amount of the predetermined pressure that is based on the self-weight of the suction head when the suction head faces vertically upward.

4. A conveyance method, comprising:

a step of moving a suction head;

a step of controlling a rotation position of the suction head centered on a predetermined rotation shaft;

a step of causing the suction head to suck or release suction of an electronic component, so that a load acting on the electronic component from the suction head in conjunction with movement of the suction head is equal to or less than a predetermined pressure;

a step of setting, based on the rotation position of the suction head, a correction amount of the predetermined pressure that is based on a self-weight of the suction head; and a step of moving the suction head from a suction position or a suction release position of the electronic component under a condition that the load acting on the electronic component from the suction head becomes the predetermined pressure.

5. A non-transitory computer readable medium, storing a program causing a computer to execute:

a process of moving a suction head;

a process of controlling a rotation position of the suction head centered on a predetermined rotation shaft;

a process of causing the suction head to suck or release suction of an electronic component, so that a load acting on the electronic component from the suction head in conjunction with movement of the suction head is equal to or less than a predetermined pressure;

a process of setting, based on the rotation position of the suction head, a correction amount of the predetermined pressure that is based on a self-weight of the suction head; and a process of moving the suction head from a suction position or a suction release position of the electronic component under a condition that the load acting on the electronic component from the suction head becomes the predetermined pressure.

* * * * *